No. 624,226. Patented May 2, 1899.
T. LEE.
REIN AND HITCHING STRAP HOLDER.
(Application filed Mar. 31, 1898.)
(No Model.)
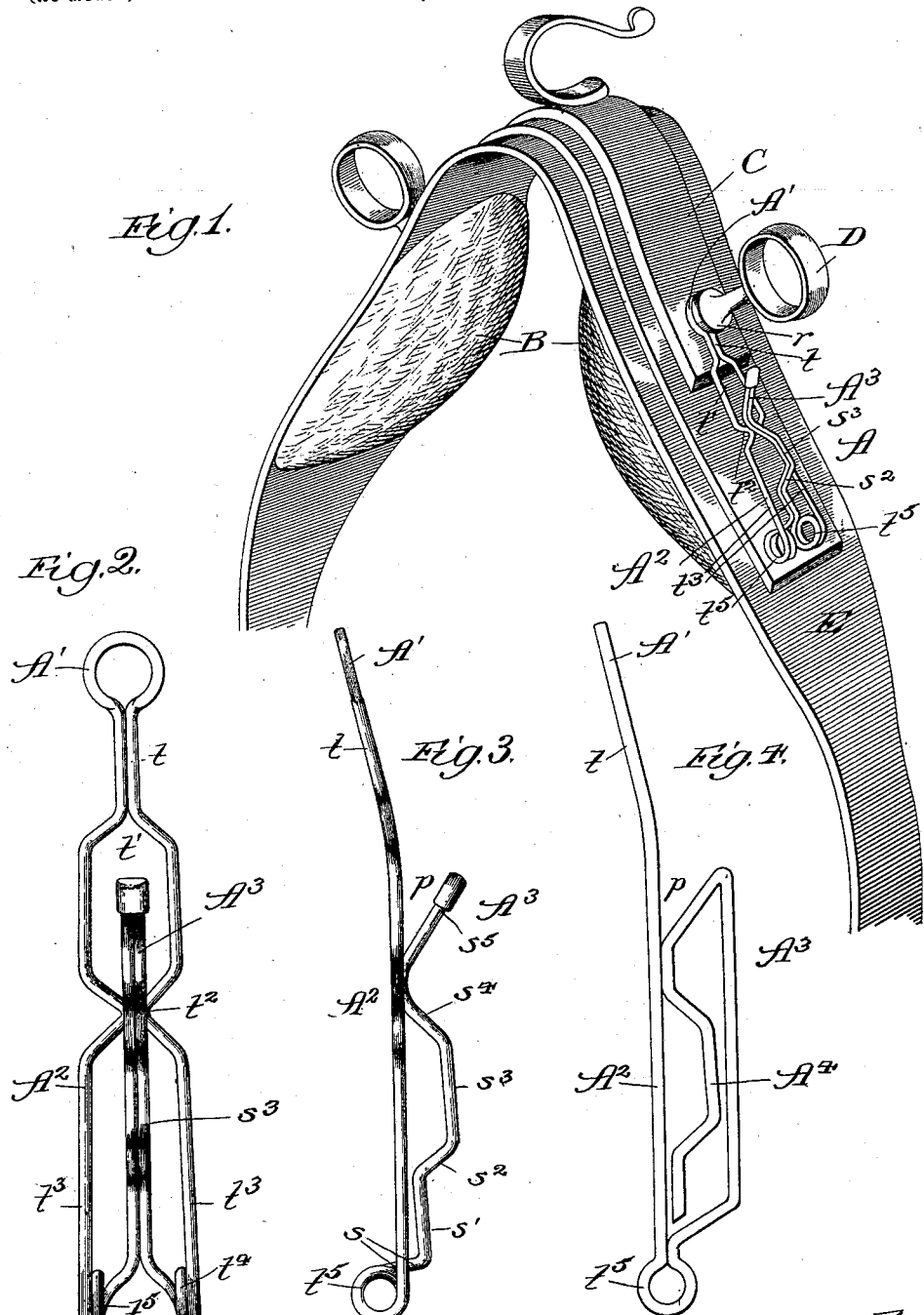
Inventor:
Turner Lee,

UNITED STATES PATENT OFFICE.

TURNER LEE, OF TAMPICO, ILLINOIS, ASSIGNOR TO JOHN H. LEE, OF CHICAGO, ILLINOIS.

REIN AND HITCHING-STRAP HOLDER.

SPECIFICATION forming part of Letters Patent No. 624,226, dated May 2, 1899.

Application filed March 31, 1898. Serial No. 675,899. (No model.)

*To all whom it may concern:*

Be it known that I, TURNER LEE, a citizen of the United States, residing at Tampico, in the county of Whiteside and State of Illinois, have invented a new and useful Improvement in Line and Lead-Strap Harness Attachments, of which the following is a specification.

My invention is in the nature of an improved line and lead-strap holder adapted for attachment to the saddle of a harness preferably by means of a perforated shank, through which the threaded shank of the terret or line-ring is passed to clamp the device to the pad-tree and serving as a substitute for the line-ring so far as the function of "doing up" the line or lead-strap is concerned.

The purpose of my invention is twofold—first, to provide a combined line and lead-strap holder in the form of a spring-metal attachment which shall be handy and efficient in use, and, second, to provide for the ready attachment of the device to the saddles of different makes of harness.

Generally stated, the invention comprises a spring-metal hook shaped device having a shank which extends downwardly parallel to the harness-pad, upon which it lies and to which it is secured, preferably, in the manner stated, and an out and up turned hook portion carried by the lower end of said shank, which extends near to the upper end of the shank to form therewith a strap-receiving channel, said hook portion being provided with means for engaging either a lead-strap or folded line, or both, at pleasure.

In the accompanying drawings, Figure 1 is a view in perspective of a harness-saddle equipped with my improved holder; Figs. 2 and 3, plan and side views, respectively, of the holder in its preferred form; and Fig. 4, a side view of the device in a modified form.

A represents the holder; B, the harness-pad; C, the pad-tree; D, the terret or line-ring, and E the tug-strap.

The device is preferably formed from cold-drawn steel wire tempered in the process of drawing. When so formed, it comprises, preferably, a perforated head or ring $A'$, a downwardly-extending shank $A^2$, affording a back portion, and an out and up turned tongue or hook portion $A^3$. A wire length is bent between its ends to form the loop $A'$, the members being extended parallel to each other to form the part $t$ of the shank, then outwardly, downwardly, and inwardly to form the rectangular loop $t'$, thence again parallel and together to form a bearing or stop $t^2$ for the tongue, thence outwardly and downwardly to form the lower part $t^3$ of the shank, thence coiled rearwardly and inwardly to form the spirals $t^4$ $t^5$, and thence extended forwardly from the tops of the coils and parallel to each other to form the base $s$ of the tongue, which projects slightly in front of the shank and between the wires thereof. The two wire members being now together are bent upwardly to form the slightly-inclined lead-strap-engaging portion $s'$, thence half outward to form the incline $s^2$, thence upwardly and slightly in to form the line-engaging portion $s^3$, thence half inward to form the incline $s^4$, and thence in a curve and half outward to form the inclined hook or tongue end $s^5$, where the wire ends are secured together by a cap-piece or in any other suitable manner.

The loop $A'$ is by preference at an angle to the shank $A^2$ in order that the device may be held tightly to the back-band under the resilience of the spring when the head is clamped between the flange $r$ of the terret and the pad-tree, which is the simple and effective way of securing the device in place. Of course the same purpose is answered if some part of the device, as the coil at the base, is caused to bear closely against the saddle before the terret has been turned completely in. The shank may be curved, if desired, to follow the contour of the saddle. The curved end of the tongue drops slightly into the loop $t'$ before striking on the portion $t^2$ of the shank, thereby insuring its being properly centered when closed.

An equivalent though perhaps more costly construction is to bend the wire length upon itself to first form the tongue portion of the device and then to form the coils and shank, finally welding the ends of the wire together at the terret-receiving loop. In the end the several parts of the device occupy the same relative position regardless of which method is followed in the manufacture.

The manner of use is as follows: The device is fastened to the saddle of the harness by the simple removal and reinsertion of the terret, its threaded shank passing through the loop A' and its flange $r$ clamping the head tightly to the pad-tree. To do up the lead-strap, it is necessary only to present the edge thereof to the channel $p$, afforded between the top part of the tongue and the shank, and draw down upon both sides of the tongue, when the strap slips readily into engagement with the portion $s'$ of the tongue, being firmly clamped thereby to the shank. To do up the line, it is first folded and similarly drawn into the space between the portion $s^3$ of the tongue and the shank, where it is firmly clamped. If desired, the device may be made to hold both the line and lead-strap at the same time. To undo either the line or lead-strap, the strap is pressed directly toward the base of the terret and is readily disengaged from the device without any violent strain being made upon the device itself.

In Fig. 4 is shown a modified form of the holder made from flat steel. In this form the essential features of my invention are preserved; but in this case the tongue $A^3$ becomes a double member, being provided at its upper end with an inturned downwardly-projecting member $A^4$, which is provided with the strap-engaging surfaces. Here the coil $t^4\ t^5$ becomes a simple loop, and for obvious reasons it is desirable to form the spring from untempered steel, which is afterward tempered. Obviously the tongue may be given the same form in this construction as in Figs. 1 to 3; but in such case the increased resilience of the double-member tongue being lacking it would be very difficult to obtain a ready-tempered steel which would answer the purpose, and to use the untempered metal necessitates skilled labor with increased cost of production.

While one of the important features of my invention lies in the simplicity of its attachment, yet it is to be understood that the device is for the purpose of some of the claims not to be limited to this mode of attachment. By the expression "out and up turned" as referring to the tongue of the spring I mean to cover all the forms shown, notwithstanding the fact that in the preferred construction the spirals at the base are formed by rearward coiling of the wire members.

The purpose of the loop $t'$, above described, is to accommodate the device to certain harnesses wherein are employed projecting screws or rivets on the back-band, which would interfere were not this precaution taken.

Springs constructed as above described may be made ornamental by japanning, nickeling, or galvanizing. They are cheaply produced, readily applied, and effective in use, enabling a very material saving of time in unhitching.

What I claim as new, and desire to secure by Letters Patent, is—

1. A strap-holder attachment for harnesses, formed from a single length of wire, and comprising a terret-receiving perforated head A', a downwardly-extending shank $A^2$ provided with a loop $t'$ and a tongue-bearing $t^2$ formed by bending or stamping the shank-wires together, pad-engaging coils $t^4\ t^5$ below the plane of the shank-wires, and an upwardly-extending clampingly-acting tongue provided with a strap-engaging portion and a curved upper end resting upon said tongue-bearing and projecting slightly into the loop $t'$ whereby the tongue is properly centered, substantially as and for the purpose set forth.

2. A combined line and lead-strap holder, comprising a downwardly-extending shank provided with means for attaching it to the harness, and an upwardly-extending tongue held close to said shank by the resilience of the metal, said tongue being provided with a line-engaging part at sufficient distance from the shank to permit the insertion of several thicknesses of line, and beneath said line-engaging part and in a plane closer to the shank, with a lead-strap-engaging part, substantially as and for the purpose set forth.

3. A line and lead-strap holder, comprising a terret-shank-receiving loop, a downwardly-extending shank provided with a tongue-bearing, and a resilient out and up turned clampingly-acting tongue having an outturned end, said holder being formed from a wire length bent near its center to form said loop, the members thence extending downward to form said shank, the shank-wires being bent together to form said bearing, the wires being then separated to form the lower part of the shank, then coiled rearwardly and inwardly and caused to project in front of the shank, then turned upwardly to form the tongue and the clamping-surfaces $s'$ and $s^3$ thereof, and finally having the wire ends fastened together and outcurved to form the tongue end, substantially as and for the purpose set forth.

TURNER LEE.

In presence of—
DAN. W. LEE,
RICHARD T. SPENCER.